United States Patent
Piene

Patent Number: 5,797,343
Date of Patent: Aug. 25, 1998

[54] SYSTEM FOR ESTABLISHING A TOWING CONNECTION BETWEEN A MARINE CASUALTY AND A SALVAGE VESSEL

[75] Inventor: Gustav E. Piene, Oslo, Norway

[73] Assignee: Bukser og Bjergning AS, Norway

[21] Appl. No.: 637,772

[22] PCT Filed: Oct. 28, 1994

[86] PCT No.: PCT/NO94/00172

§ 371 Date: Aug. 9, 1996

§ 102(e) Date: Aug. 9, 1996

[87] PCT Pub. No.: WO95/12518

PCT Pub. Date: May 11, 1995

[30] Foreign Application Priority Data

Nov. 4, 1993 [NO] Norway ............... 933989

[51] Int. Cl.$^6$ ........................... B63B 21/56
[52] U.S. Cl. ............... 114/242; 114/253; 244/137.1; 441/83
[58] Field of Search ............... 114/242, 251, 114/51, 253, 311; 441/83; 244/137.1

[56] References Cited

U.S. PATENT DOCUMENTS 747,102  12/1903  Vance et al. ............... 114/51
4,138,077  2/1979  Okumura ............... 441/83

FOREIGN PATENT DOCUMENTS 1044079  12/1978  Canada ............... 114/242
1625776  2/1991  U.S.S.R. ............... 441/83

OTHER PUBLICATIONS

Derwent's Abstract No. 92-5727/01, Week 9201, abstract of SU, 1625776 (Rost Stapel Assoc), 7 Feb. 1991.

*Primary Examiner*—Sherman Basinger
*Attorney, Agent, or Firm*—Zarley, McKee, Thomte, Voorhees, & Sease

[57] ABSTRACT

A system for establishing a towing connection between a marine casualty and a salvage vessel, characterized in that it comprises a loop-forming arrangement which is held distended in the horizontal plane and which is connected to a towline, the towline being releasably connected to a distending system by a device whereby the connection is released when the distending system loses its distending effect, the loop-forming arrangement defining an open and unobstructed space being adapted to be brought in, over and around a strong structural member on the casualty by a helicopter or the like.

13 Claims, 4 Drawing Sheets

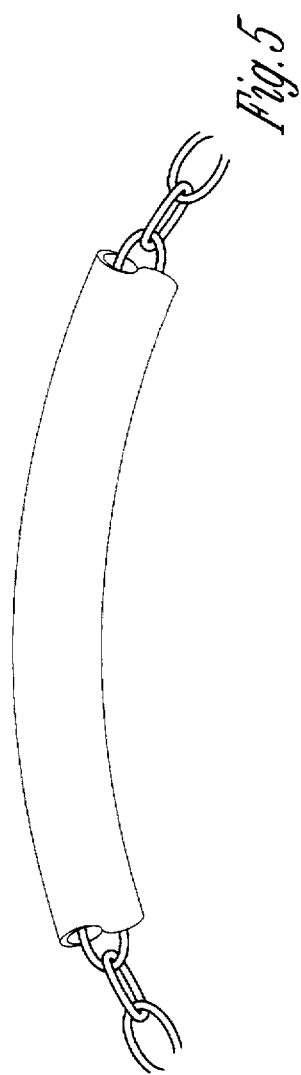
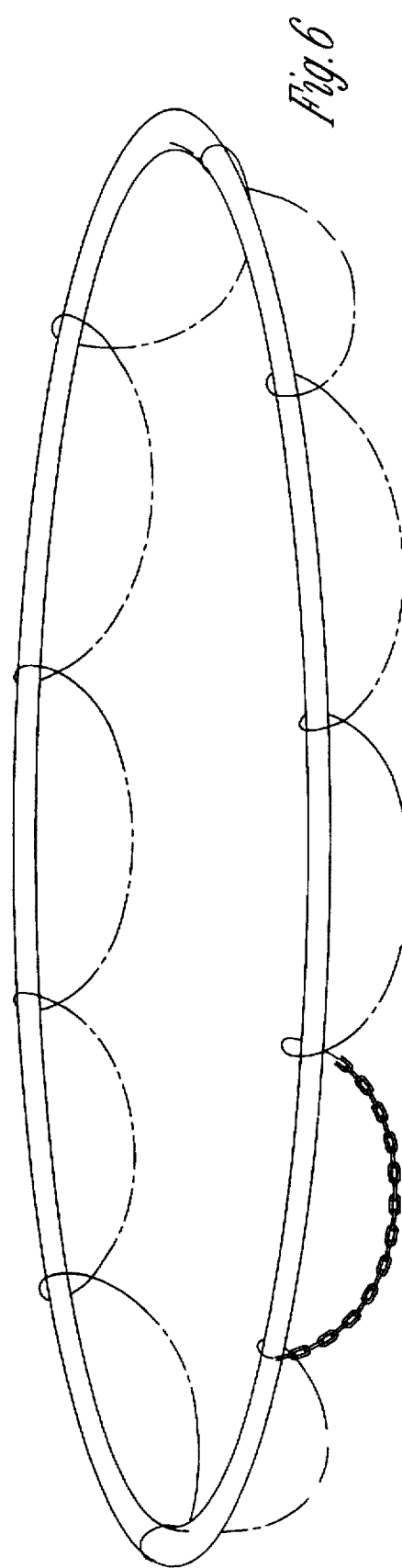

SYSTEM FOR ESTABLISHING A TOWING CONNECTION BETWEEN A MARINE CASUALTY AND A SALVAGE VESSEL

BACKGROUND OF THE INVENTION

Field of the Invention

The present invention concerns a system for establishing a towing connection between a marine casualty and a salvage vessel. The establishing of such a connection is in many instances extremely difficult if not impossible without endangering the lives of personnel. The present invention aims at a system for establishing such a towing connection without the need for salvage personnel being present on board the casualty.

SUMMARY OF THE INVENTION

The purpose aimed at by the invention is achieved by means of a loop-forming arrangement, e.g. in the form of a chain, which is held distended in the horizontal plane and which is connected to a towline, the loop-forming arrangement being adapted to be brought in over and around a strong structural member on the casualty by means of a helicopter or the like.

Further features of the invention will appear from the claims.

BRIEF DESCRIPTION OF THE DRAWINGS

The invention shall be closer described with reference to the drawings, in which FIGS 4–6 shown specific examples of possible loop-forming arrangements, or parts thereof, according to embodiments of the invention.

DETAILED DESCRIPTION OF THE DRAWINGS

Figure 1:
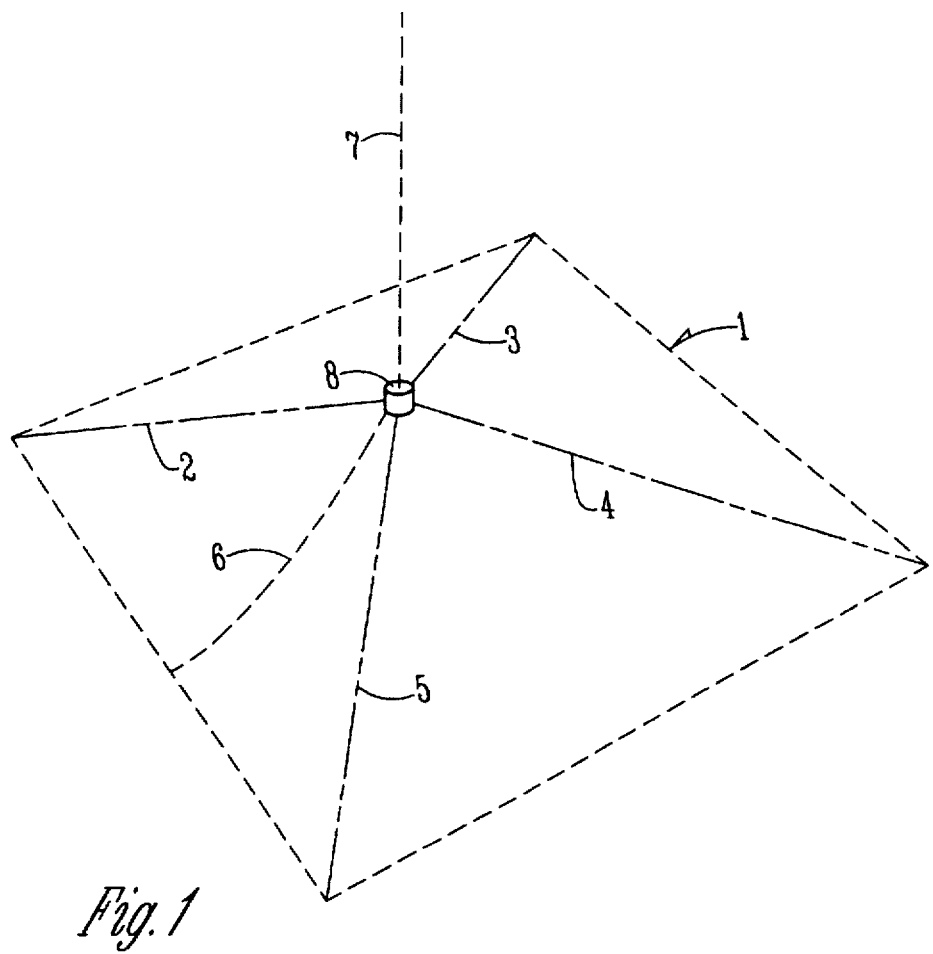
FIGS. 1, 2 and 3 show three embodiments of the invention.

The arrangement according to the invention, such as shown schematically in FIG. 1 of the drawings, comprises an endless chain 1 which by means of stays or ribs 2, 3, 4 and 5 is maintained in a distended state substantially in the horizontal plane and which is brought in over and around a strong structural member on the casualty by a helicopter or the like. The endless chain 1 is connected to a towline 6, 7 in the form of a length of chain 6 connected to a towline proper 7. The towline, possibly in combination with a forerunner, may conveniently be wound on a drum or the like suspended below the helicopter.

The system consisting of the elements 1 to 6 may be lifted by means of a helicopter or the like connected to a central coupling 8 in the system of stays or ribs 2–5, e.g. by means of a separate lifting line or by means of the towline 6, 7. At a convenient moment of time during the positioning of the loop on the casualty, the connection through the coupling 8 is released, and as the lifting power through the coupling 8 is removed, the system of stays or ribs 2–5 looses its distending effect. When the chain 1 is located around the fixed strong structural member on the casualty, the helicopter may move away therefrom, whereby the towline 6, 7 is laid from the endless chain 1, which is now placed around e.g. a windlass, across the railing of the casualty, and the towline and, if appropriate, its forerunner, is rolled out from the drum so that it may be caught by the salvage vessel, e.g. by being laid across or by being picked up by the salvage vessel.

Figure 4:
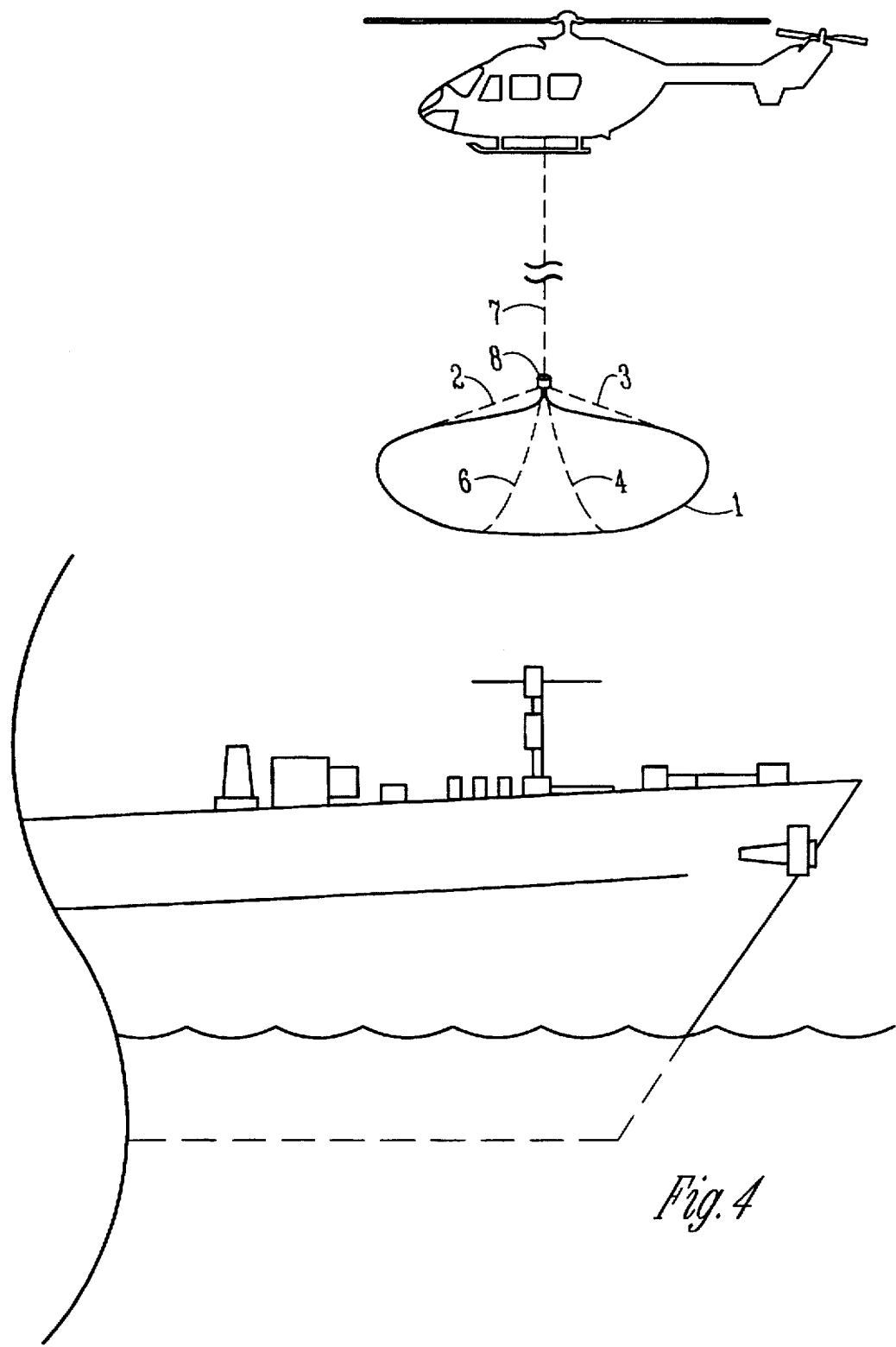

Endless chain 1 could alternatively, for example, be an endless steel or fiber rope. The loop-forming arrangement could be in the form of a noose such as shown in FIG. 4, a chain embedded in a rigid, breakable ring such as shown in FIG. 5, or an endless chain suspended form a rigid ring such as shown in FIG. 6.

The system of stays or ribs (2–5; 2'–4') can be adapted to lose its distending effect when the loop-forming arrangement (1, 1') and the system of stays or ribs (2–5; 2'–4') is lowered to contact with the casualty. The system of stays or ribs (2–5; 2'–4') can be adapted to lose its distending effect when the loop-forming arrangement (1, 1') is subjected to a force through the towline (6, 7; 6', 7).

Figure 2:
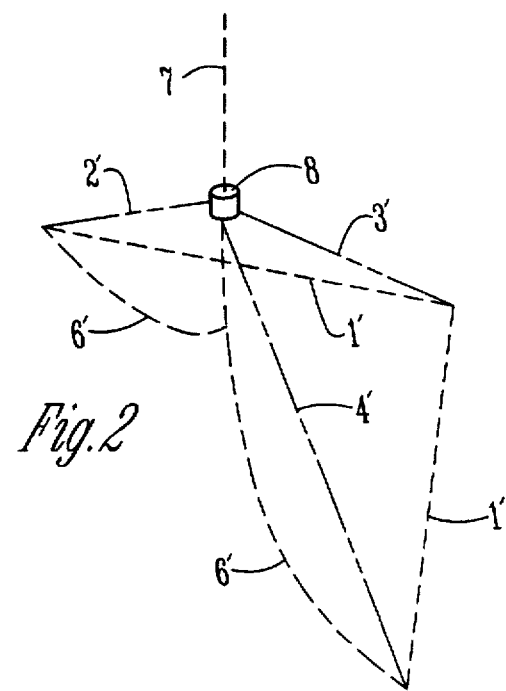

In the embodiment shown in FIG. 2, the system of the invention comprises a chain length 1' which by means of a system of stays or ribs 2', 3', 4' is kept distended, substantially in the horizontal plane. This system is brought, e.g. by means of a helicopter, over (or "behind") a fixed structure on a casualty. The chain 1' is connected to a towline 6', 7 in the form of a crowfoot chain 6' which in turn is connected to a towline proper 7. The towline and, if appropriate, its forerunner, could conveniently be wound on a drum suspended below the helicopter.

As an alternative to the arrangement with a crowfoot chain for connection to the towline, it is within the scope of the invention to connect each end of the chain length 1' to a towline to the salvage vessel.

The system shown in FIG. 2 may, in the same manner as that in FIG. 1, be lifted by a helicopter or the like, the helicopter being connected to a central coupling 8 in the system of stays or ribs 2', 3', 4', e.g. by means of a separate lifting line or by means of the towline 6', 7. The modus operandi is in other respects identical to that described with reference to FIG. 1.

The release of the system of stays or ribs may also be affected in other ways, e.g. by exposing the loop 1, 1' to the towing force in the towline.

Figure 3:
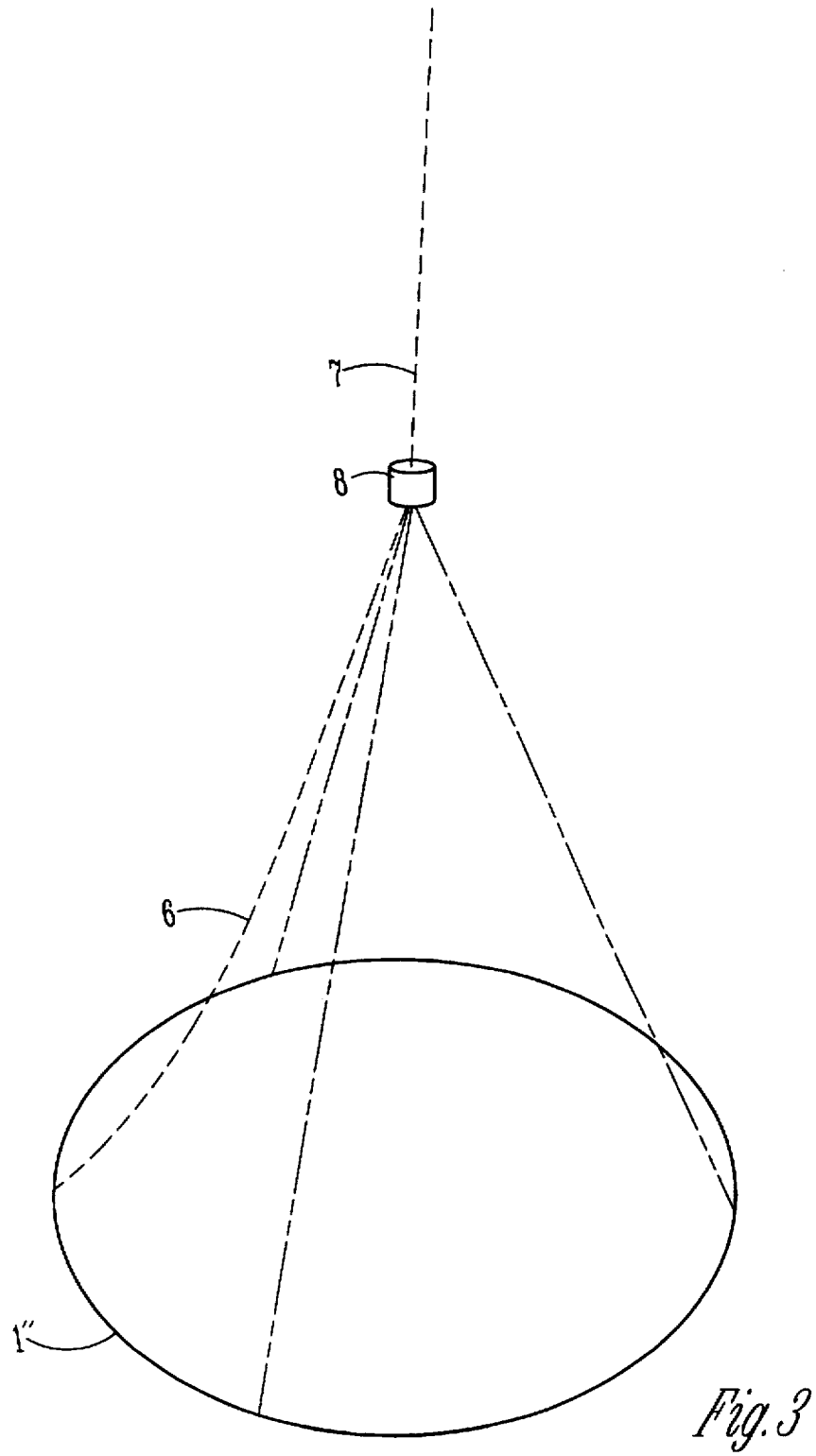

In the embodiment shown in FIG. 3 the system of the invention comprises a ring 1" carrying a chain. The ring 1", which is suspended from the coupling 8 in any convenient manner, is rigid and consequently distended from the outset, but when subjected to the towing force through the towline 6, 7 upon release of the coupling 8, the ring 1" may break so that the loop is no longer distended. In other respects the modus operandi is identical to that of the embodiments of FIGS. 1 and 2.

As an alternative to the embodiment of FIG. 3, the endless chain may be suspended in any convenient manner from a ring 1", the distended condition being nullified by the ring breaking or by the connection between the chain and the ring being broken.

What is claimed is:

1. A system for establishing a towing connection between a marine casualty and a salvage vessel, characterized in that it comprises a loop-forming arrangement which is held distended in the horizontal plane and which is connected to a towline, the towline being releasably connected to a distending system by means of a device whereby the connection is released and the distending system loses its distending effect, the loop-forming arrangement defining an open and unobstructed space being adapted to be brought in over and around a strong structural member on the casualty.

2. The system according to claim 1, characterized in that the loop-forming arrangement is held distended by means of a system of stays or ribs.

3. The system according to claim 2, characterized in that the system of stays or ribs is adapted to lose its distending effect when the loop-forming arrangement and the system of stays or ribs is lowered to contact with the casualty.

4. The system according to claim 2, characterized in that the system of stays or ribs is adapted to lose its distending effect when the loop-forming arrangement is subjected to a force through the towline.

5. The system according to claim 1, characterized in that the loop-forming arrangement is constituted by an endless chain.

6. The system according to claim 1, characterized in that the loop-forming arrangement is constituted by an endless steel or fiber rope.

7. The system according to claim 1, characterized in that the loop-forming arrangement is constituted by a length of chain or wire which at each end is connected to a towline through a member.

8. The system of claim 7 wherein the member is a crowfoot.

9. The system according to claim 1, characterized in that the loop-forming arrangement is in the form of a noose.

10. The system according to claim 1, characterized in that the loop-forming arrangement is constituted by a chain embedded in a rigid, breakable ring.

11. The system according to claim 1, characterized in that the loop-forming arrangement is constituted by an endless chain suspended from a rigid ring.

12. The system of claim 1 wherein the loop-forming arrangement is adapted to be brought in and over a strong structural member on the casualty by a motive means.

13. The system of claim 12 wherein the motive means is a helicopter.

* * * * *